April 28, 1970 T. R. SPECHT 3,509,507
GROUNDED Y—Y THREE-PHASE TRANSFORMER
Filed Dec. 30, 1968 2 Sheets-Sheet 1

WITNESSES
INVENTOR
Theodore R. Specht
BY
ATTORNEY

United States Patent Office 3,509,507
Patented Apr. 28, 1970

3,509,507
GROUNDED Y—Y THREE-PHASE TRANSFORMER
Theodore R. Specht, Sharon, Pa., assignor to Westinghouse Electric Corporation, Pittsburgh, Pa., a corporation of Pennsylvania
Filed Dec. 30, 1968, Ser. No. 787,863
Int. Cl. H01f 33/00
U.S. Cl. 336—12                    4 Claims

ABSTRACT OF THE DISCLOSURE

A three-phase transformer of the core-form type including Y—Y connected primary and secondary windings having grounded neutrals, and having a new and improved four-legged magnetic core. Three of the legs of the magnetic core are winding legs for receiving the primary and secondary phase windings of the three electrical phases, and the remaining leg, which has no windings, functions during unbalanced load conditions to provide a path for zero sequence fluxes.

BACKGROUND OF THE INVENTION

Field of the invention

The invention relates in general to electrical apparatus, such as transformers, and more particularly to three-phase electrical transformers of the core-form type, and magnetic cores therefor.

Description of the prior art

Three-phase electrical transformers of the three-legged core-form type for pad mounting, wherein the primary supply voltage is connected to the transformer via underground shielded cables, presents a circuit which may give rise to ferroresonance. For example, when the primary windings of the transformer are sequentially switched with single phase cutouts, which is the usual practice, a point is reached during the switching sequence where flux is flowing in the winding leg of an open circuited winding, due to one or both of the other phases being energized. The inductive reactance of the open circuited winding is effectively connected in series circuit relation with the ground capacitance of the shielded cable connected thereto, and the voltage induced into the open circuited winding due to the flux flowing therethrough from the energized phase, or phases, may give rise to overvoltages due to ferroresonance occurring in this series circuit.

The problem of ferroresonance may be obviated, or at least minimized within acceptable limits, by connecting both the primary and secondary windings of the transformer in Y, and by grounding their neutral points. The grounded neutral of the Y connection short circuits the resonant reactances, and minimizes the probability of ferroresonance.

The grounded Y—Y connection of the transformer, however, provides a path for zero sequence currents to flow during unbalanced load conditions, and during line-to-ground faults. Since the zero-sequence fluxes flowing in the three winding legs are in phase, some provision must be made to provide a return path for this flux, or it will be forced outside of the magnetic core and into the end frames of the core and into the tank walls, which may cause serious heating of these components.

Disposing conventional auxiliary or tertiary windings on each winding leg, and connecting them in a delta configuration, is not a satisfactory or economical solution in the usual pad-mount installation. The zero sequence impedance of this delta connected tertiary winding will usually be so low that the magnitude of the zero sequence current flowing upon the occurrence of a fault located between the primary windings of the transformer and the electrical generator or power source, may cause one or more of the transformer primary fuses to blow, instead of clearing the fault solely with the protective apparatus designed for this purpose at the source. Designing the tertiary winding to have the proper impedance would be costly and, therefore, an undesirable solution to the problem.

For these reasons, it is conventional to utilize a five-legged magnetic core structure with a three-phase core-form pad mounted transformer. The primary and secondary windings are each connected in Y and grounded. The three intermediate legs of the magnetic core are winding legs, and the two outer legs provide a return path for any zero sequence flux which flows in the winding legs of the core. The impedance of the two outer legs to the flow of the zero sequence flux is such that the flux remains in the core, and therefore does not establish a return path through the core end frames and tank walls; and, the magnitude of the zero sequence current is limited, preventing the transformer fuses from blowing upon a line-to-ground fault located between the power source and the transformer primary winding.

While the five-legged core-form magnetic core solves the hereinbefore mentioned problems associated with pad mounted transformers having grounded Y—Y connected windings, the five-legged core produces a non-sinusoidal flux in the outer legs, which have no windings, and in the yokes, which gives rise to abnormally high losses and sound level. It also increases the length of the yoke portion of the magnetic core.

Accordingly, it would be desirable to provide a new and improved three-phase transformer of the core-form type which may be pad mounted and connected in a grounded Y—Y configuration, which has lower losses and a lower sound level, than a five-legged magnetic core of the same rating.

SUMMARY OF THE INVENTION

Briefly, the present invention comprises a new and improved three-phase transformer of the core-form type having grounded Y—Y connected primary and secondary windings, and a new and improved magnetic core for use therein, which has four leg members. Three of the leg members of the magnetic core are winding legs, about which the three phases of the electrical windings are disposed, and the fourth or additional leg is disposed on one end of the core, outside the windings. During normal operation of the transformer with a four-legged core, the instantaneous sum of the fluxes in the three winding legs is zero. Therefore, during normal operation, the flux in the fourth leg is zero. Since the fourth leg is at the end of the structure, the four-legged core, during normal operation, operates similar to a three-legged core of similar rating. The flux flowing out of each winding leg of the four-legged core is determined by the voltages applied to the windings. The geometry of the four-legged core is such that the fluxes in all parts of the core are directly determined by the winding leg fluxes, and not by the magnetic properties of the core. This is in contrast to the five-legged core where flux flows in the two outer leg members, with the magnitude depending upon the magnetic properties of the core. The fourth or additional leg provides a return path for any zero sequence flux which may flow under fault conditions. It inherently has a low impedance to the zero sequence flux and prevents the transformer fuses from blowing upon a line-to-ground fault located between the primary windings of the transformer and the source of alternating potential, and very little zero sequence flux leaves the magnetic core, preventing heating of the end frames and tank walls. Further, the length of the yoke sections of the magnetic core is reduced, compared with a similarly rated five-legged magnetic core, as much as the length of the window opening of a conventional three-legged magnetic core of similar rating. The yoke lamination width of this new four-legged three-phase core is about twice that of a five-legged core, but since flux distortion is eliminated in the four-legged core, the four-legged core may be designed with higher flux densities, thus reducing the weight and cost of the transformer.

BRIEF DESCRIPTION OF THE DRAWINGS

Further advantages and uses of the invention will become more apparent when considered in view of the following detailed description and drawings, in which.

DESCRIPTION OF PREFERRED EMBODIMENTS

Figure 1:
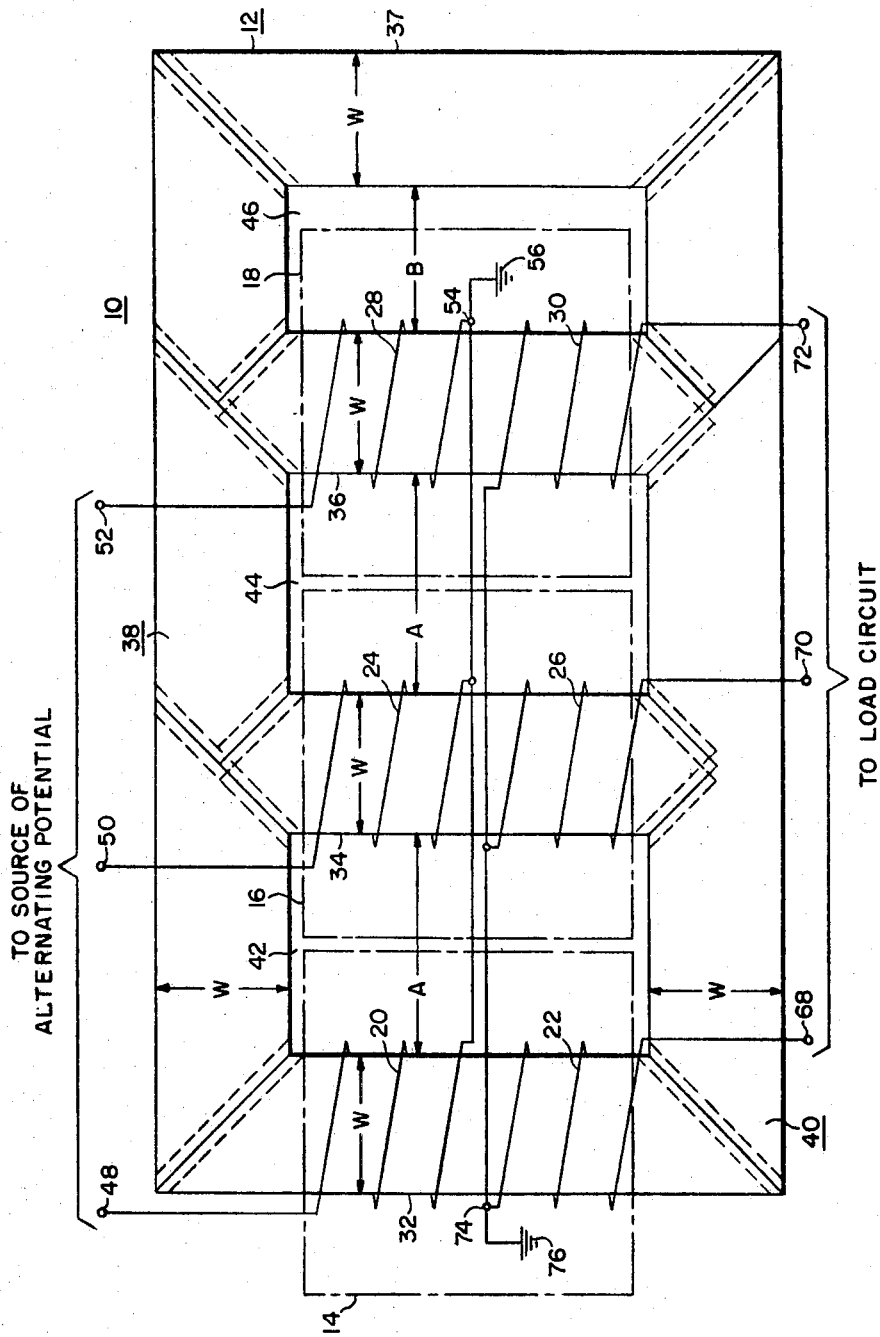
FIGURE 1 is an elevational view of a transformer constructed according to the teachings of the invention.

Referring now to the drawings, and FIG. 1 in particular, there is shown a three-phase transformer 10 constructed according to the teachings of the invention. Transformer 10 includes a new and improved magnetic core structure 12, shown in an elevational view, and winding phases 14, 16 and 18, shown generally in dotted outline, each having primary and secondary windings, which are shown schematically. Phase winding 14 includes primary and secondary windings 20 and 22 respectively, phase winding 16 includes primary and secondary windings 24 and 26, respectively, and phase winding 18 includes primary and secondary windings 28 and 30, respectively. Transformer 10 is of the three-phase, core-form type, with its primary and secondary windings being connected in a grounded Y—Y configuration.

More specifically, magnetic core 12 includes first, second and third winding leg members 32, 34 and 36, and an additional leg member 37, disposed in spaced parallel relation, which have their ends joined by upper and lower yoke members 38 and 40. Leg members 32, 34, 36 and 37 are each formed of a plurality of stacked metallic, magnetic laminations, such as silicon, cold rolled electrical steel, having at least one preferred direction of magnetic orientation. The ends of the laminations which make up the first winding leg member 32 and the additional leg member 37, have their ends cut diagonally, for example at an angle of 45° with respect to the longitudinal dimension of the lamination, and the ends of the laminations which make up the second and third winding leg members 34 and 36 are cut to form "spear points," with two diagonal cuts at each end.

It is important to note that the fourth leg member 30 is disposed outside, or at one end of, the winding leg members, such as adjacent winding leg member 36, as shown in FIG. 1. Unlike leg members 32, 34 and 36, leg member 37 is not a winding leg member. The advantages of this construction will be explained hereinafter.

The upper and lower yoke members 38 and 40, respectively, are constructed of a plurality of layers of metallic, magnetic laminations similar to the leg members 32, 34, 36 and 37, with each layer having one or more laminations. As shown in FIG. 1, it is convenient for each layer to be divided into two or more laminations. For example, the upper yokes 38 may contain three laminations per layer, while the lower yoke 40 may include two laminations per layer. The ends of outer lamination of both the upper and lower yoke members are cut diagonally to match the diagonal cuts on the laminations of the outer leg members 32 and 37. Each layer of laminations of the upper and lower yoke members 38 and 40 also contains an appropriate notch or indentation formed by two adjacent laminations, or cut in the side of a single lamination, which matches the spear points of the two intermediate leg members 34 and 36.

The joints formed in each layer of laminations between the various leg and yoke members may be offset from similar joints in succeeding layers in a predetermined stepped-lap pattern, as shown by the dotted lines in FIG. 1, and disclosed in U.S. Patent 3,153,215, issued Oct. 13, 1964, which is assigned to the same assignee as the present application, or any other suitable joint arrangement may be used, such as the butt-lap configuration.

Leg members 32, 34 and 36, and the portions of the upper and lower yoke members 38 and 40 which join them, are dimensioned the same as they would be in a conventional three-legged magnetic core of the same rating, with the width of the leg members being the same. The additional leg member 37 is shown as having the same width as the winding legs 32, 34 and 36, which is its maximum width. System conditions may make it possible to reduce the width of the additional leg member, but since it will facilitate manufacturing to use the same lamination width for all leg members, for practical purposes it will usually have the same width W as the winding legs. As shown in FIG. 1, the yoke laminations have the same width W as the winding leg laminations. However, yoke widening may be used when necessary to increase the yoke dimension between the outer sides of the yoke members and the ends of the spear points of the intermediate leg members 20 and 30.

Figure 2:
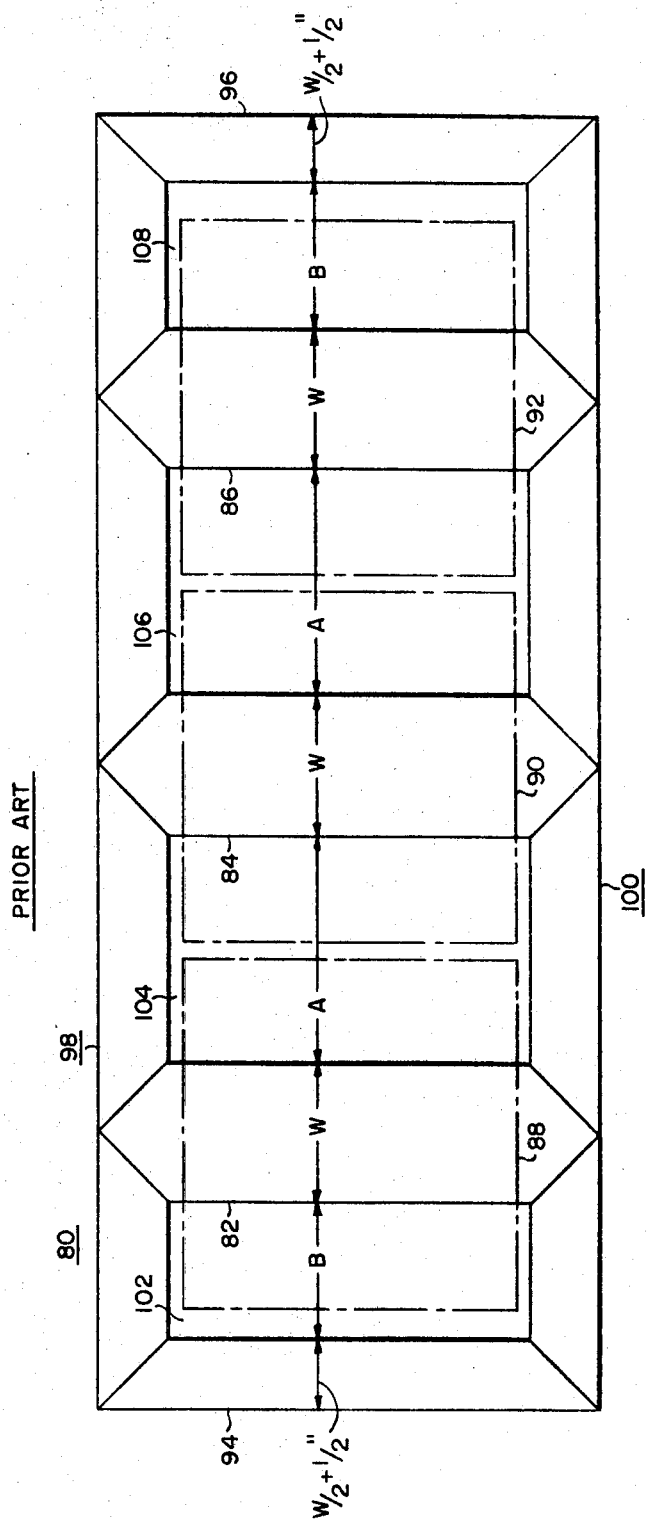
FIG. 2 is an elevational view of a transformer constructed according to the teachings of the prior art.

The remainder of the magnetic core 12 from winding leg 36 to leg 37 is different than a conventional three-legged magnetic core, with this portion of the upper and lower yoke portions being lengthened, in order to accommodate the fourth leg member 37, and provide a window for receiving the windings on winding leg member 36. For comparison with the prior art five-legged core, which is shown in FIG. 2, the windows in magnetic core 12 dimensioned to receive windings from two winding legs is given the dimension A, and the window for receiving the windings from one winding leg is given the dimension B. Thus, the window 42 between winding legs 32 and 34 is given the width dimension A, the window 44 between winding legs 34 and 36 is given the width dimension A, and the window 46 between winding leg 36 and the additional leg 37 is given the width dimension B. Thus, the overall length of magnetic core 12 is equal to $4W+2A+B$.

The primary and secondary windings are connected in a grounded Y—Y configuration, with the primary winding including phase winding sections 20, 24 and 28 disposed about winding legs 32, 34 and 36, respectively. Phase winding sections 20, 24 and 28 have one end connected to terminals 48, 50 and 52, respectively, which are adapted for connection to a three-phase source of alternating potential, and the other ends of the phase winding sections are connected in common at neutral terminal 54, which is grounded at 56.

The secondary winding includes phase winding sections 22, 26 and 30, which are disposed about winding leg members 32, 34 and 36, respectively. Phase winding sections 22, 26 and 30 have one end connected to terminals 68, 70 and 72, respectively, which are adapted for connection to a three-phase AC load circuit, and their other ends are connected in common at neutral terminal 74, which is grounded at 76.

While the primary and secondary phase winding sections on each winding leg are shown spaced apart, according to conventional core-form construction they will usually be disposed concentrically adjacent one another.

Pad mounted power transformers connected into the electrical system via underground shielded cables, present ferroresonance problems due to the capacitance of the shielded cable to ground. The incidence of ferroresonance is substantially reduced by connecting the windings in a grounded Y—Y configuration, as shown in FIG. 1.

This connection of the windings, however, provides a path for zero sequence currents to flow during unbalanced load conditions and during short circuit conditions, and thus some provision should be made for the zero sequence flux. Shell-form magnetic core construction automatically provides return paths for the zero sequence flux in each winding leg, and this basic five-legged configuration of the shell-form magnetic core has been carried over into the core-form construction, as shown in the five-legged core-form magnetic core 80 of the prior art in FIG. 2. For purposes of comparison with the magnetic core 12 of FIG. 1, the prior art of five-legged magnetic core 80 will be assumed to be the same rating as magnetic core 12, and dimensioned accordingly.

More specifically, as shown in FIG. 2, magnetic core 80 has three intermediate winding leg members 82, 84 and 86, which receive the phrase winding sections 88, 90 and 92, respectively, of the primary and secondary windings, which are indicated generally in doted outline. Magnetic core 80 also has two outer leg portions 94 and 96, and upper and lower yoke portions 98 and 100, respectively. The yoke portions 98 and 100 join the ends of the spaced parallel leg portions, forming windows 102, 104, 106 and 108. The winding leg members 82, 84 and 86 have a width dimension equal to W, and windows 104 and 106 have a width dimension equal to A, since they each receive windings from two winding legs. The outer leg members 94 and 96 usually have a width dimension equal to one-half of the winding leg width plus ½ inch, or $$\frac{W}{2}+\frac{1}{2}$$

inch, and windows 102 and 108 require a width dimension equal to B, since each receives the windings of a single winding leg. Thus, the overall width or length dimension of the five-legged magnetic core structure 80 is equal to $4W+2A+2B+1$ inch. Since the overall width of the four-legged magnetic core structure 12 shown in FIG. 1, which is constructed according to the teachings of the invention, is $4W+2A+B$, the upper and lower yoke members 98 and 100 of magnetic core 80 are each longer than the upper and lower yoke members 24 and 26 of magnetic core 12, by the dimension $B+1$ inch. Therefore, the magnetic core 12 is substantially narrower than the magnetic core 80. Further, the magnetic core 12 is easier to manufacture than magnetic core 80, as it may be constructed from laminations having the same width dimension W, while magnetic core 80 requires at least two lamination widths, W and $$\frac{W}{2}+\frac{1}{2}$$

inch.

The five-legged magnetic core 80 of the prior art has substantially higher losses and a higher sound level than the conventional three-legged magnetic core of the same rating, especially on transformers rated 1000 kva. and larger. This is due to the self-generation of harmonic fluxes, which distort the flux in the yoke members. The four-legged magnetic core structure 12, which has no waveform distortion of the yoke fluxes, compared to the distortion in a five-legged core, produces losses and a noise level which more closely conform to those of similarly rated three-legged magnetic cores. Therefore, in order to obtain a five-legged core which has a sound level and losses comparable to a four-legged core constructed according to the teachings of the invention, the dimensions and cross sectional area of the five-legged core shown in FIG. 1A would have to be substantially increased.

Leg member 37 of magnetic core 12 shown in FIG. 1, provides a return path for zero sequence fluxes which flow in phase in the winding legs during an unbalanced load condition, providing a path which has a lower impedance to the zero sequence flux than the core end frames and the steel enclosure or tank, thus diverting the majority of the zero sequence flux from these elements, and preventing their heating. Further, the impedance of leg member 37 to the zero sequence fluxes limits the magnitude of the zero sequence currents to a value which will not blow the primary fuses on the transformer during a line-to-ground fault located between transformer primary windings and the source potential.

The only time that leg member 37 will carry magnetic flux is during extraordinary conditions, such as short circuits and unbalanced phase loadings. Thus, instead of employing the same high grade electrical steel for this leg member, it may be possible to use lower cost steel, such as hot rolled steel.

The magnetizing impedance of the additional leg member 37 is not as critical as it is for the winding leg members. Therefore, it may not be essential that this leg be joined to the yoke portion with an interleaved type joint, such as shown in FIG. 1. For example, the additional leg may be joined to the yoke portions with a butt-type joint.

While magnetic core 12 is illustrated as having winding legs of rectangular cross-section, suitable for coils having rectangular openings, it is to be understood that the winding legs may have a cruciform cross-section, suitable for receiving coils having circular openings.

In summary, there has been disclosed a new and improved three-phase transformer of the core-form type having a new and improved magnetic core structure, and grounded Y—Y connected primary and secondary windings, suitable for pad mounting and connection to underground shielded cables. The fourth leg, disposed outside the winding legs, provides a path for zero sequence flux during unbalanced phase conditions, while operating similar to a conventional three-phase core of similar rating during normal operating conditions. This provides a substantial advantage over the prior art five-legged magnetic core structures usually used in such applications, as the four-legged magnetic core disclosed herein has a smaller width dimension than a comparable five-legged core. The four-legged magnetic core structure disclosed herein has no waveform distortion of the yoke fluxes, reducing its losses and sound level compared to the five-legged core. The four-legged magnetic core also facilitates manufacturing, compared with the five-legged magnetic core, as all of the laminations may be of same width.

Since numerous changes may be made in the above described apparatus and different embodiments of the invention may be made without departing from the spirit thereof, it is intended that all matter contained in the foregoing description or shown in the accompanying drawings, shall be interpreted as illustrative, and not in a limiting sense.

I claim as my invention:

1. A three-phase transformer comprising:
a magnetic core having only first, second, third and fourth leg members,
first and second yoke members disposed to connect the ends of said first, second, third and fourth leg members, with said fourth leg member being outside said first, second and third leg members,
and first, second and third phase winding assemblies disposed in inductive relation with said first, second and third leg members, respectively, said first, second and third phase winding assemblies including primary and secondary windings connected in a grounded Y—Y configuration,
said fourth leg member being free of windings.

2. The three-phase transformer of claim 1 wherein the first, second and third winding leg members and the fourth leg member have substantially the same width dimension.

3. The three-phase transformer of claim 2 wherein the width of the first and second yoke members is at least equal to the width of the leg members.

4. The three-phase transformer of claim 1 wherein at least the first, second and third leg members have the same width dimension, and the first and second yoke members have a width dimension at least as large as the width dimension of the first, second, and third leg members.

References Cited

FOREIGN PATENTS

| 436,839 | 2/1912 | France. |
| 451,583 | 10/1927 | Germany. |

THOMAS J. KOZMA, Primary Examiner

U.S. Cl. X.R.

336—215